UNITED STATES PATENT OFFICE.

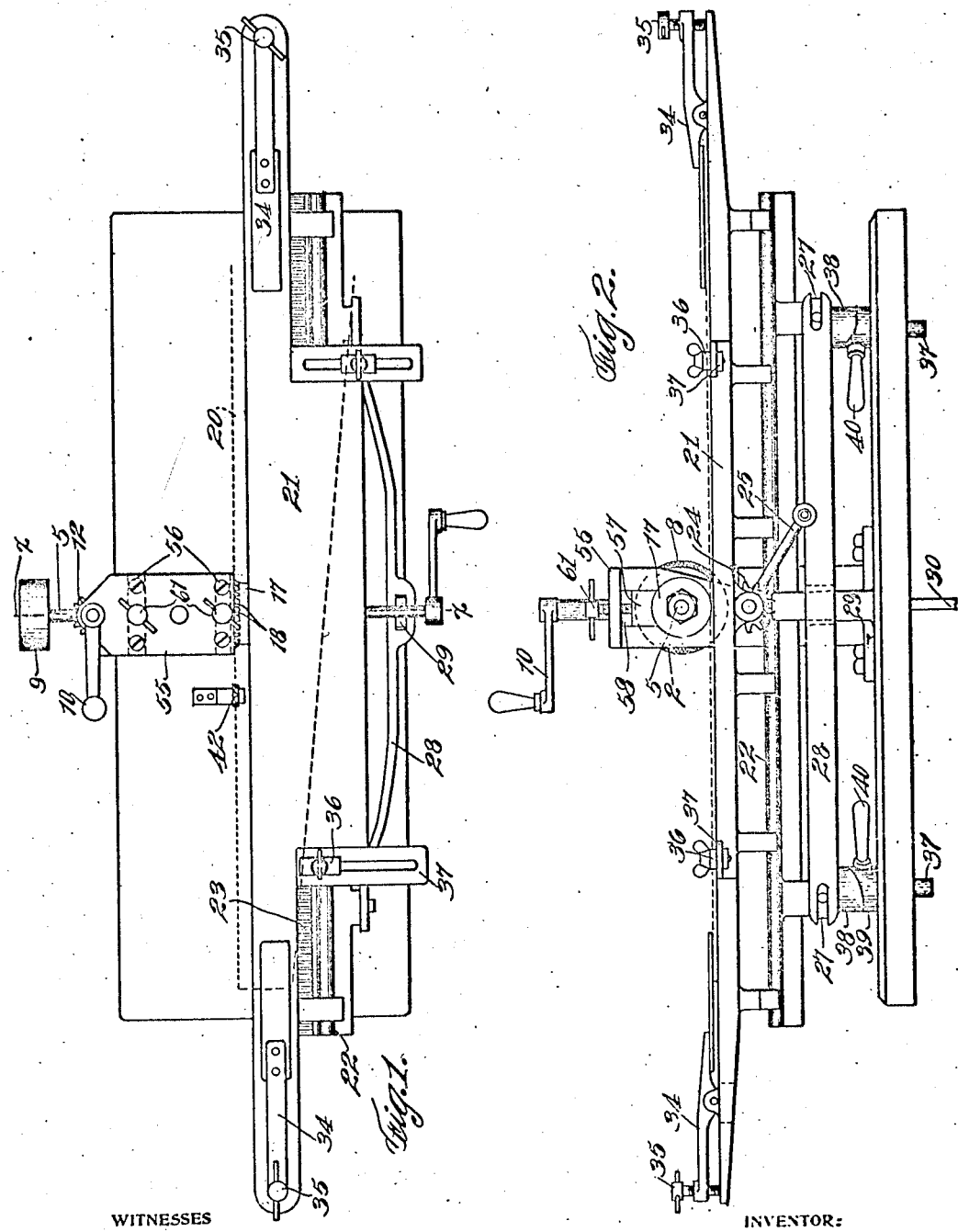

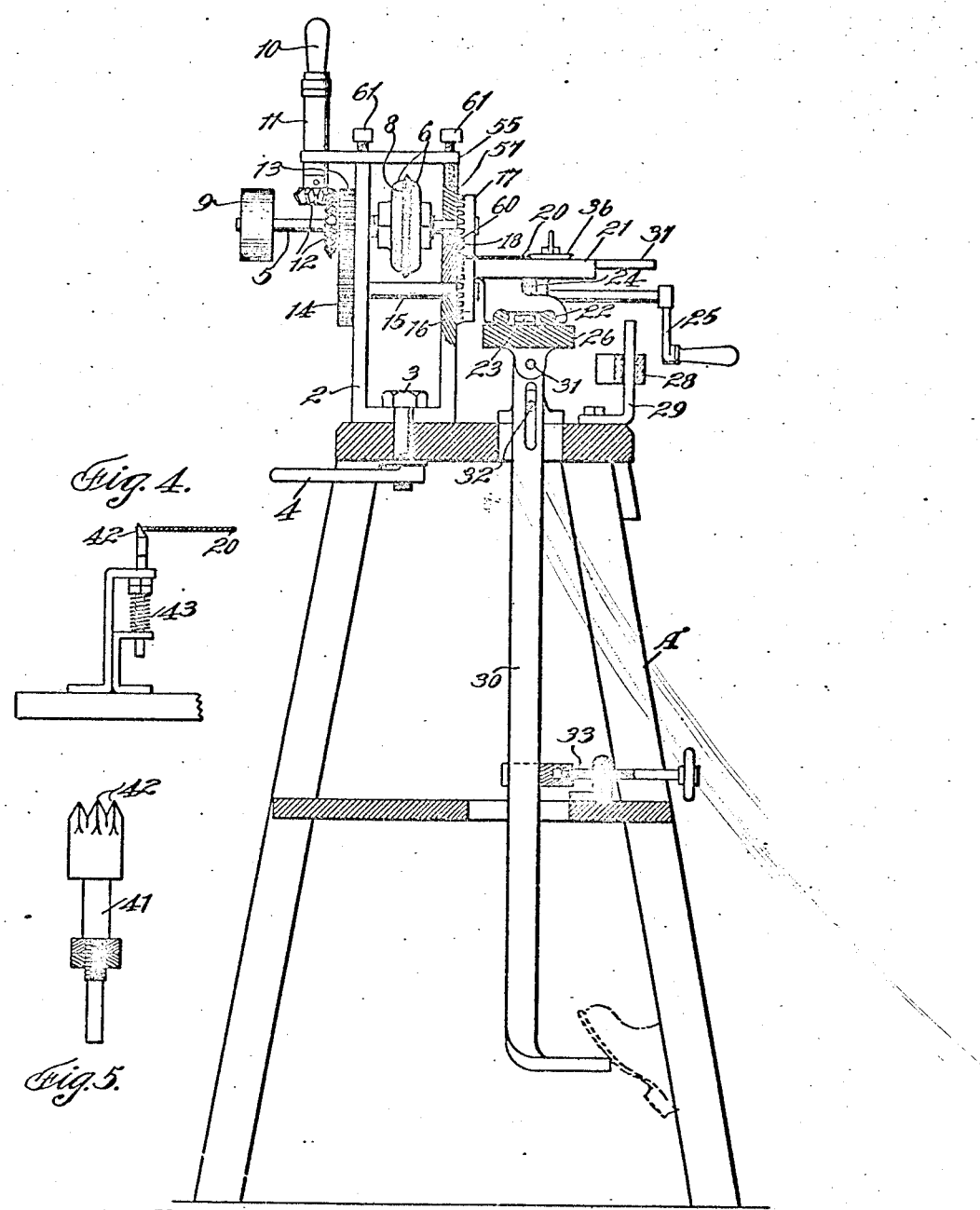

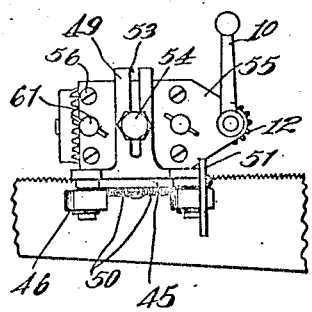
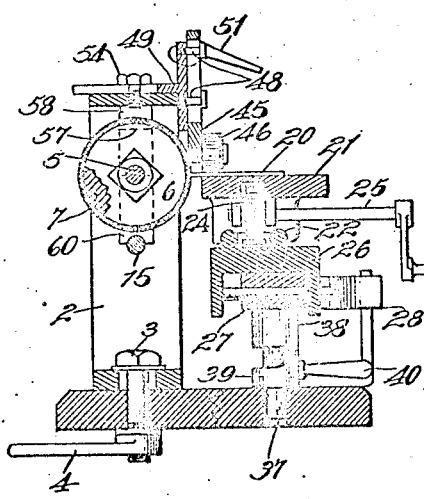
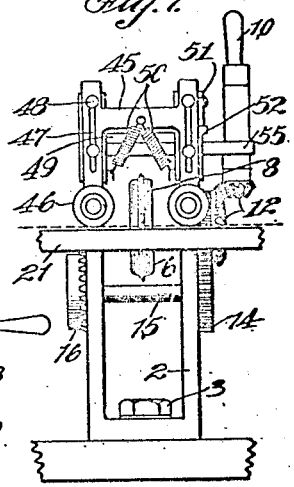
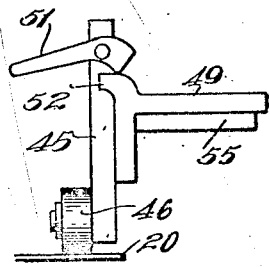
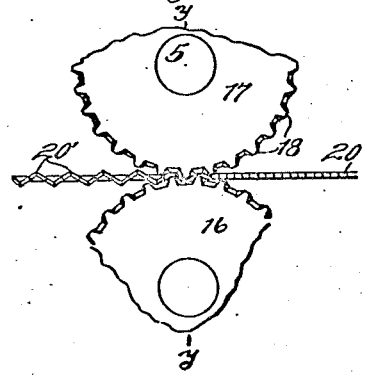

JOHN F. BOND, OF MILPITAS, CALIFORNIA.

MACHINE FOR SHARPENING AND SETTING SAWS.

No. 895,150.    Specification of Letters Patent.    Patented Aug. 4, 1908.

Application filed June 19, 1907. Serial No. 379,721.

*To all whom it may concern:*

Be it known that I, JOHN F. BOND, citizen of United States, residing at Milpitas, in the county of Santa Clara and State of California, have invented new and useful Improvements in Machines for Sharpening and Setting Saws, of which the following is a specification.

My invention relates to machines for sharpening and setting saws. Its object is to provide a simple, compact and practical machine for expeditiously and accurately sharpening saws and setting the same after sharpening; which machine will require very little skill to operate, and which may be adjustable to rip saws and crosscut saws alike, or to saws with teeth of different pitch and depth and number.

The invention consists of the parts and the construction and combination of parts as hereinafter more fully described and claimed, having reference to the accompanying drawings, in which—

Figure 1 is a plan view of the invention with the setting means in operative position. Fig. 2 is a front elevation of the same. Fig. 3 is an end elevation in partial section. Figs. 4 and 5 are details of the saw gage. Fig. 6 is a section on line *x—x* of Fig. 1. Fig. 7 is a front elevation with the filing device turned into operative position; the parts being at right angles to the position shown in Figs. 1 and 2. Fig. 8 is a plan view of the sharpening and setting mechanism. Fig. 9 is an enlarged detail of the saw setting wheels. Fig. 10 is a section on *y—y*, Fig. 9. Fig. 11 is a detail in section of the guide for the back of the saw blade. Fig. 12 is a detail illustrating the means for preventing vibration of the saw during the sharpening operation.

A represents a suitable supporting frame for the operative parts of the machine.

2 is a tool frame which is pivotally mounted on the support A so as to be turnable in any direction and to any extent about a vertical pivot bolt 3. A clamp nut with a handle 4 engages the pivot bolt 3 to lock the tool frame 2 in any desired position.

Suitably journaled in the frame 2 is a shaft 5 which carries two clamp disks 6, screw-threaded on the shaft 5 to turn toward and from an intermediate fixed disk or hub 7, Fig. 6. This hub disk 7 forms a support for the file member or abrading annulus 8, which presents a V-shape cutting edge to the teeth of the saw, and which file member or abrading annulus is adapted to be clamped from opposite sides between the members 6. Motion is given to the shaft 5 by any suitable means, either by power connections through a pulley 9 on the shaft, or from a hand-crank 10 operating through the shaft 11 and bevel gearing 12.

Shaft 5 carries a gear 13 meshing a corresponding gear 14 on a counter-shaft 15 journaled in the tool frame 2. The opposite end of the shaft 15 carries a saw setting tool 16 adapted and arranged to coöperate with the companion setting tool 17 carried on the outer end of the shaft 5. These tools 16—17 are shown more in detail in Figs. 9–10 and comprise two wheels having peculiarly shaped intermeshing teeth 18 around one edge.

A portion of the periphery of the wheels 16—17 is flat as shown in Fig. 10, and the remaining portion carries the setting teeth 18. The flattened portion is adapted when the machine is used for setting the saw teeth to grip the upper and lower edges of a saw as 20, with the teeth 20' of the saw disposed one opposite a corresponding upper or lower tooth 18 on the wheels 16—17. The teeth on the two wheels are adapted to intermesh, and the amount that they intermesh corresponds to the offset from the plane of the saw desired to be given to the saw teeth.

The operation of setting the teeth of a saw will be more particularly described hereinafter. The saw to be sharpened is supported by appropriate means in suitable relation to the sharpening member 8. By turning the tool carrier 2 a quarter turn, the setting members 16—17 are brought into position to act on the saw teeth without removing the saw from its clamping means, all as will be described shortly.

The means for clamping the saw in position with respect either to the sharpening means or the setting means, is here shown as follows:

21 represents the saw table which is mounted on suitable guides 22 for reciprocation, and is moved back and forth by appropriate means as the stationary rack 23 and pinion 24. The pinion 24 is manipulated by a hand-crank 25. The guides 22 and rack 23 are mounted on a carriage 26 which has a limited movement in guides 27 in a direction transverse to the path of reciprocation of the carriage 21.

A bow spring 28 centrally supported for vertical adjustment on a fixed standard 29 has its opposite ends secured to the carriage 26. The function of the spring 28 is to yieldingly support the saw 20 which is adapted to be clamped on the table 21, against the rotary file or sharpening member 8 when the saw is being sharpened. A lever 30 is pivoted at 31 to the carriage 26 and is fulcrumed to a fixed point of support as at 32. Pushing in on lever 30 moves the carriage 26 and the saw-support outward away from the saw filing and setting means and against the tension of the spring 28. Releasing the pressure on the lower end of the lever 30 allows the spring to act to move the saw inward again into operative position. The limit of inward movement of the saw and its supporting parts can be regulated by suitable means as the adjusting screw 33.

The saw is clamped on the table 21 by any appropriate means, as for instance the hinged clamp members 34 and screws 35; the clamp members 34 being pivoted between their ends as shown in Fig. 2, and having a limited oscillating movement to permit an underneath insertion of the saw. By then screwing up the screws 35 against the stop afforded by the table 21, the saw is securely clamped. The back of the saw is suitably supported against the action of the file member and against the action of the setting members by suitable means as the stops 36, Figs. 1 and 11, and which stops 36 are adjustable back and forth in slotted guides 37.

The carriage 26 is vertically adjustable on standards 37 slidable in suitable guides in the support A. A cam collar 38 is secured to each standard and a corresponding cam collar 39 having a handle 40 is turnable loose on the standards 37. With the cams 38—39 in the position shown in Fig. 2, the top plane of the table 21 is at its lowest point and in position for the saw to be operated on by the rotary setting devices 16—17. By giving a half-turn to each of the handles 40, the carriage, table and saw will be raised to bring the saw into a horizontal plane with the shaft 5 as shown in Fig. 6, so that when the abrading tool is in a position at right angles to the position shown in Fig. 2, the teeth of the saw will be suitably disposed for the proper sharpening action of the abrader 8.

The operation of the device is as follows: The saw is laid on the table 21 and clamped at the ends by the clamping devices 34 and suitably supported at the rear by the guides 36. With the tool frame 2 turned so as to bring the abrading tool 8 into operative position with the saw teeth, the handles 40 are then turned from the position shown in Fig. 2 to that shown in Fig. 6. The screw 33 is then adjusted to allow the spring 28 to act to press the teeth with sufficient force against the abrading member 8; this stop device 33 is designed to limit the depth to which the abrading member shall cut.

If a rip saw is to be sharpened, the tool frame 2 is adjusted by the clamp bolt 3 so that the cutting wheel 8 is substantially perpendicular to the line of the saw teeth. If a cross-cut saw is to be sharpened, the frame 2 is turned more or less to one side to allow the cutting wheel to operate at the proper angle; saws having a different number of teeth to the inch, or having teeth of different pitch, require each a different abrading tool, and also require different setting tools 16—17. Having adjusted the saw so that it engages the filing member at the proper angle and is held thereto by the proper pressure, the shaft 5 is revolved. Having finished one tooth the lever 30 is pushed in to disengage the saw teeth temporarily from the file, and the feed crank 25 is turned to advance the saw one tooth space.

In order to insure a uniform step by step movement of the saw and so obtain uniformity in results, I provide a gage, such as is shown in Figs. 4 and 5: 41 represents a stem having a serrated head 42 corresponding to the pitch and character of the saw teeth. This stem is yieldingly supported so as to have the serrations of the head 42 engage the saw teeth and intermatch therewith when the saw is in proper position before the sharpening member 8. As the crank 25 is turned to advance the saw, this serrated head will be pressed down to compress a spring 43 and allow the teeth of the saw to ride over the gage, which latter however, rises immediately so that the serrations on the gage come into line with the interdental spaces in the saw. It is understood that the disposition of this gage, and the pitch and character of the serrations are such that they will not injure the saw teeth, but will clearly indicate to the operator just when he is to stop turning the crank 25. Having finished the sharpening operations, the handles 40 are turned back into the position shown in Fig. 2. The frame 2 is then turned approximately a quarter-turn, or sufficient to bring the setting members 16—17 into a situation to permit the insertion of the saw teeth between the members 16—17, and so that alternate saw teeth will be acted on by the projections 18 on the upper member 17, and the intermediate saw teeth will be oppositely acted on by the projections 18 on the lower member 16. Then by properly advancing the saw and rotating the members 16—17, each saw tooth is given its exact set. The saw is set without taking it from the table 21, and the action of setting of the entire saw, is very quickly done.

In order to prevent vibration of the saw during the sharpening operations, suitable means are provided as the adjustable presserfoot 45 which has the rollers 46 to bear on the top of the saw on either side of the sharpening member 8. This presser or foot-piece 45 is vertically slotted as at 47, and pins 48 engage in these slots and in a bracket 49. Springs 50 tend normally to press the rollers 46 downward on the saw when the presser is in lower operative position. The presser is raised and lowered by an angular lever 51, which has one of its arms provided with a cam face to operate on a stop 52 and hold the presser in elevated inoperative position when the lever 51 is lifted. Pressing down on the lever 51 causes the cam end to ride back over 52 and behind the pivot of the lever to lower the presser. The bracket 49 is slotted as shown at 53 and a screw 54 engages in this slot and screws into the top plate 55 on the tool carriage. By means of the clamp screw 54 and slot 53, the presser can be adjusted so as always to bear uniformly on the top of the saw irrespective of the inclination of the grinder 8 with respect to the length of the saw. The plate 55 is held in place by four screws 56. By taking out these screws 56 and lifting off the plate the bearing block 57, Figs. 2 and 3, which holds the ends of the shaft 5 in place, may be easily lifted out to permit the shaft 5 and cutter being taken out and a new or different cutter put in, according to the saw to be operated upon. The slots 58 in the sides of the tool frame extend to the underside of the countershaft 15 so that by taking out the intermediate spacing or bearing blocks 60, this countershaft can be removed to permit both setting tools 16—17 to be changed. The bearing blocks are adjustably held in proper position in their slots by means of the clamp screws 61.

Having thus described my invention, what I claim and desire to secure by Letters Patent, is—

1. In a saw sharpening and setting machine, the combination with a suitable saw-support, of a pivotally mounted frame turnable in a plane transverse of the saw and provided with a pair of intergeared parallel shafts, one of said shafts carrying a rotary abrading member, and both of said shafts provided with co-acting rotary setting members, said rotary setting members having offset portions on the periphery, the offset portions of one member intermeshing with the offset portions on the other member.

2. In a machine of the character described, the combination with a frame or support, of a pair of intergeared parallel shafts, one of said shafts carrying an abrading member, and both of said shafts provided with co-acting setting members, said setting members having offset portions with the offset portions of one member intermeshing with the corresponding portions on the other member.

3. In a machine of the character described, the combination with a suitable saw-support, of a pivotally mounted frame turnable in a plane transverse of the saw and provided with a pair of intergeared parallel shafts, one of said shafts carrying a rotary abrading member and both of said shafts provided with co-acting rotary setting members, said setting members having offset portions on the periphery with the offset portions of one member intermeshing with the offset portions on the other member, means for giving the saw-support longitudinal motion, means for moving the saw-support toward and from the abrading member, and means for causing the saw to engage the abrading member with a yieldable pressure.

In testimony whereof I have hereunto set my hand in presence of two subscribing witnesses.

JOHN F. BOND.

Witnesses:
 FRANK H. TOPHAM,
 JAMES M. ASKINS.